Feb. 23, 1943.  H. S. BROADWATER  2,312,072
ENDLESS TRACK FOR VEHICLES
Original Filed March 7, 1940
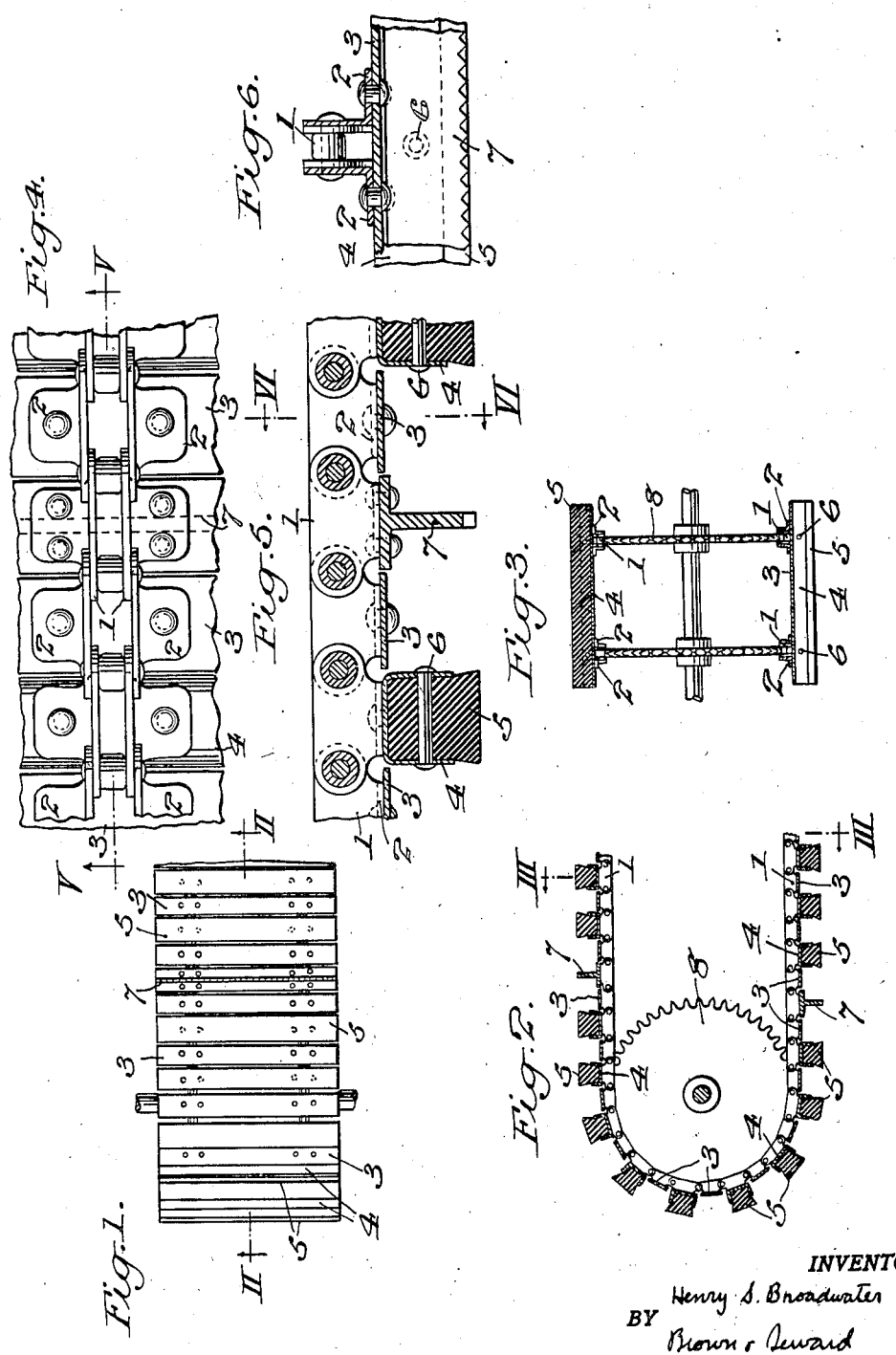
INVENTOR
Henry S. Broadwater
BY
Brown & Seward
ATTORNEYS Patented Feb. 23, 1943

2,312,072

UNITED STATES PATENT OFFICE 2,312,072

ENDLESS TRACK FOR VEHICLES

Henry S. Broadwater, Ridgefield, Conn.; Victoria Tenger, executrix of Henry S. Broadwater, deceased, assignor to Victoria Tenger, Ridgefield, Conn.

Original application March 7, 1940, Serial No. 322,663. Divided and this application January 31, 1941, Serial No. 376,754

5 Claims. (Cl. 305—10)

This invention relates to an endless track for vehicles, and particularly a track which is adapted to support and propel a vehicle upon snow of any degree of softness as well as on icy or clear roads. This is a division of my copending application Serial No. 322,663, filed March 7, 1940.

An object of the invention is to provide such a track which will ensure perfect traction on all types of snow surfaces.

Another object is to provide a track which will not become clogged with snow.

A further object is to provide a track which can readily be adapted for use on various conventional types of motor vehicles in order to convert such vehicles for efficient operation over snow.

Another object of the invention is to provide certain improvements in the form, construction, arrangement and materials of the several parts whereby the above named and other objects may effectively be attained.

A practical embodiment of the invention is represented in the accompanying drawing, in which Fig. 1 represents a plan view of part of the endless track;

Fig. 2 represents a vertical section taken along the line II—II of Fig. 1;

Fig. 3 represents a transverse vertical section taken along the line III—III of Fig. 2;

Fig. 4 represents a detail plan view of a part of the track chain with tread elements secured thereto;

Fig. 5 represents a vertical section taken along the line V—V of Fig. 4, and

Fig. 6 represents a transverse vertical section taken along the line VI—VI of Fig. 5.

Referring to the drawing, the endless track comprises preferably a pair of chains 1 which may conveniently be standard conveyor chains of the roller type with integrally formed attaching plates 2. For the best results over various types of surfaces it is desirable to use a combination of different tread members, and the arrangement shown herein has proved to be particularly effective. Alternating tread members are formed simply of flat aluminum plates 3 bolted or riveted to the attaching plates 2; and other tread members comprise channels 4, also bolted or riveted to the attaching plates 2, which channels form a support for rubber tread blocks 5, the latter being retained within the channels by bolts or rivets 6. The rubber tread blocks are arranged to project a substantial distance beyond the channels, as shown in Figs. 2 and 5. While the alternation of rubber and aluminum tread members will give excellent results either on snow or on a clear road, it is desirable to provide also the T-shaped aluminum bars 7 (having saw-toothed or plain edges) at intervals which may be, for instance, every twenty links of the chain, to ensure adequate traction on any icy surfaces which may be encountered. In any event, the spacing of the bars 7 should be such that one or more of the bars will always be in ground engaging position when the track is mounted on a plurality of wheels or rolls including a driving wheel 8 and idle wheels or rolls, not shown, in accordance with familiar practice. The T-bars 7 are bolted or riveted to the supporting plates 2 as in the case of the plates 3 and channels 4.

It has been found that snow will not readily adhere to rubber or to aluminum, and the use of these materials to make up all or the greater part of the driving tread is of importance since it eliminates the possibility of the mechanism becoming clogged or caked with snow. The alternation of high and low tread members gives a castellated profile which ensures perfect traction on all kinds of snow surfaces, and any tendency of the snow to become caked on the belt between the rubber tread blocks is eliminated not only by the use of the non-clogging materials, rubber and aluminum, but also by the fact that the belt "breaks" as it passes around the sprocket wheel 8, thus releasing any cake of snow or ice which might have been picked up.

It will be appreciated that the endless track elements just described may be mounted for use on the rear axle of an automobile without substantial modification except to replace the automobile wheels with sprocket wheels 8, so that this arrangement is particularly convenient in cases where it is desired to convert an automobile for efficient operation on snow.

Referring to the operation of a vehicle equipped with such a track on icy or a cleared road, it will be observed that the proportion of metal bearing on the ground compared to the total rubber surface is very much less than the proportion of ordinary antiskid chains on an automobile tire, so that a cleared road will not be damaged by the operation of the vehicle, while the bars 7 provide a much firmer grip on ice than is possible with ordinary chains.

Wherever the material "aluminum" is mentioned herein it will be understood that alloys thereof such as "duralumin" and the like are intended to be included; and the word "rubber" is also intended to include synthetic rubber-like materials having the desirable properties referred to herein, and to refer to a material approximating tire tread stock in its physical and mechanical characteristics.

It will be apparent that various changes may be made in the construction, form and arrangement of the several parts without departing from the scope of my invention and hence I do not intend to be limited to the particular embodiment herein shown and described, but what I claim is:

1. An endless track for vehicles comprising, high resilient rubber tread members and low flat aluminum tread members arranged alternately, and high metal tread members arranged at intervals such that at least one metal tread member is in contact with the ground at any given position of the track.

2. An endless track for vehicles comprising, a plurality of endless chains, at least one of which is adapted for positive engagement with a driving wheel, transverse elements secured to corresponding links of each chain, alternating elements including rigid channels and high tread members of resilient rubber supported therein, and intervening alternating elements including low flat tread members of aluminum.

3. A track in accordance with claim 2 in which a minor proportion of said high tread members are replaced by high tread members provided with a relatively sharp metallic edge extending in a direction transverse to the length of the belt.

4. An endless track for vehicles comprising, a pair of endless chains, at least one of which is adapted for positive engagement with a driving wheel, transverse metallic elements secured to corresponding links of each chain at points spaced substantial distance inward from the ends of said elements, alternating elements consisting of channels opening outwardly with respect to the space enclosed within the chains, high resilient rubber tread members filling and projecting out of said channels, and intervening alternating elements consisting of flat aluminum plates constituting low tread members.

5. A track in accordance with claim 4 in which a minor proportion of said high tread members are replaced by metallic tread members of substantially the same height having a relatively sharp metallic edge extending in a direction transverse to the length of the belt.

HENRY S. BROADWATER.